(12) United States Patent
Yagoobi

(10) Patent No.: US 7,261,521 B2
(45) Date of Patent: Aug. 28, 2007

(54) ELECTRODE DESIGN FOR ELECTROHYDRODYNAMIC CONDUCTION PUMPING

(75) Inventor: Jamal Seyed Yagoobi, Naperville, IL (US)

(73) Assignee: Illinois Institute of Technology, Chicago, IL (US)

( * ) Notice: Subject to any disclaimer, the term of this patent is extended or adjusted under 35 U.S.C. 154(b) by 403 days.

(21) Appl. No.: 10/504,996

(22) PCT Filed: Jun. 16, 2003

(86) PCT No.: PCT/US03/18930

§ 371 (c)(1), (2), (4) Date: Aug. 18, 2004

(87) PCT Pub. No.: WO04/001944

PCT Pub. Date: Dec. 31, 2003

(65) Prior Publication Data

US 2005/0053472 A1    Mar. 10, 2005

Related U.S. Application Data

(60) Provisional application No. 60/390,848, filed on Jun. 21, 2002.

(51) Int. Cl.
*F04F 11/00* (2006.01)
(52) U.S. Cl. ........................................... 417/48
(58) Field of Classification Search ................. 417/48, 417/50, 485, 49; 62/3.1, 259.2
See application file for complete search history.

(56) References Cited

U.S. PATENT DOCUMENTS 4,767,953 A    8/1988 Furuya et al.
6,265,025 B1   7/2001 DePaoli et al.
6,932,580 B2 * 8/2005 Yagoobi et al. ............... 417/48

FOREIGN PATENT DOCUMENTS

FR    1 246 669 A    11/1960
WO    WO 02/07292 A2    1/2002

OTHER PUBLICATIONS

International Search Report for PCT/US03/18930 dated Oct. 17, 2003 (2 pages).

* cited by examiner

*Primary Examiner*—Anthony Stashick
*Assistant Examiner*—Vikansha Dwivedi
(74) *Attorney, Agent, or Firm*—Flynn, Thiel, Boutell & Tanis, P.C.

(57) ABSTRACT

An electrohydrodynamic conduction liquid pumping system includes a vessel configured to contain a liquid or a liquid/vapor therein. This vessel can be of a elongate conduit configuration, an elongate channel configuration or a liquid enclosure configuration. At least a single pair of electrodes are disposed in a spaced apart relation to each other on the vessel and configured to be oriented in the liquid. A power supply is coupled to the electrodes and operable to generate electric fields in between the pair of electrodes, the electric forces inducing a net liquid movement relative to the vessel. Various electrode designs are embraced within the concept of this invention.

41 Claims, 10 Drawing Sheets

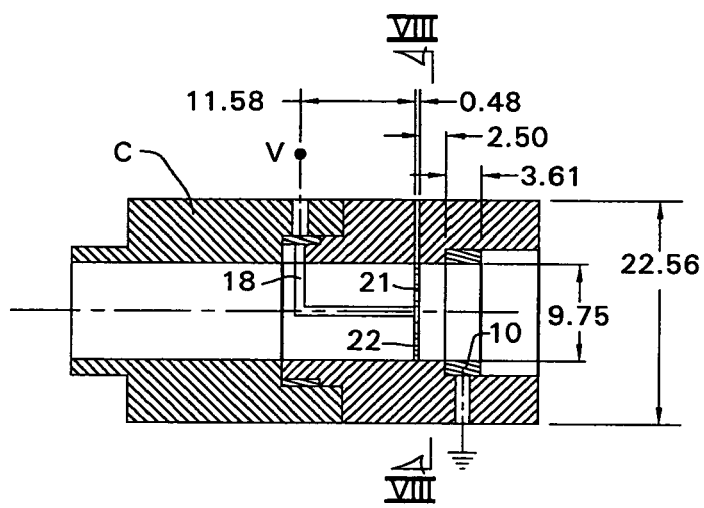
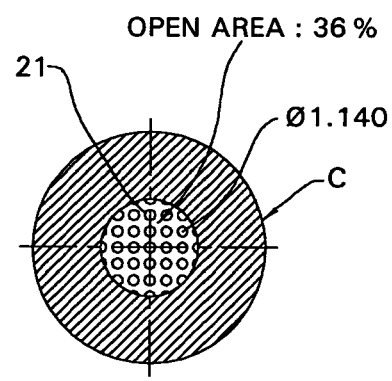
FIG. 7  FIG. 8
(UNIT : MM)
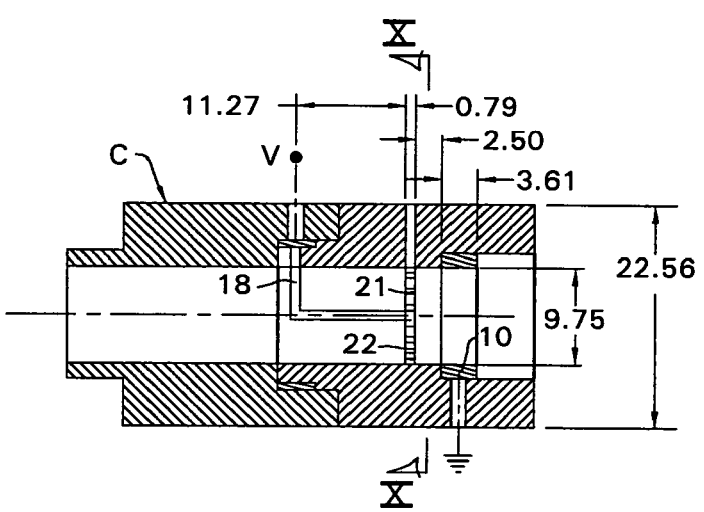
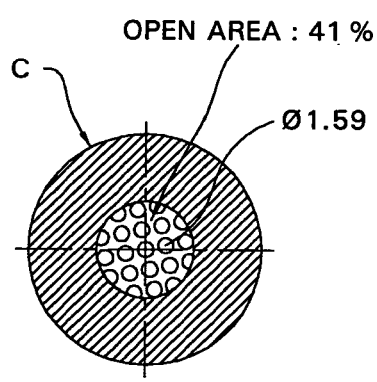
FIG. 9  FIG. 10
(UNIT : MM)

(UNIT : MM)

(UNIT : MM)

ELECTRODE DESIGN FOR ELECTROHYDRODYNAMIC CONDUCTION PUMPING

CROSS-REFERENCE TO RELATED APPLICATIONS

This application is a national stage application under 35 USC 371 of PCT/US03/18930, filed Jun. 16, 2003 which claims the benefit of U.S. Provisional Application Ser. No. 60/390,848, filed Jun. 21, 2002.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Contract No. 32525-54750 awarded by NASA—Headquarters—Microgravity Fluid Physics Program.

BACKGROUND OF THE INVENTION

The subject matter of this disclosure is related to the disclosure in co-pending application Ser. No. PCT/US01/22803, filed Jul. 18, 2001, now U.S. Pat. No. 6,932,580, which is incorporated herein by reference. With the discovery set forth therein, there became an ever increasing demand for improved conduction pumping characteristics. Various new electrode configurations were investigated by me and found to be successful and are the subject matter of this disclosure.

SUMMARY OF THE INVENTION

An electrohydrodynamic conduction liquid pumping system includes a vessel configured to contain a liquid or a liquid/vapor therein. This vessel can be of a elongate conduit configuration, an elongate channel configuration or a liquid enclosure configuration. At least a single pair of electrodes are disposed in a spaced apart relation to each other on the vessel and configured to be oriented in the liquid. A power supply is coupled to the electrodes and operable to generate electric fields in between the pair of electrodes, the electric forces inducing a net liquid movement relative to the vessel. Various electrode designs are embraced within the concept of this invention.

BRIEF DESCRIPTION OF THE DRAWINGS

The objects and purposes of this invention will be apparent to persons acquainted with apparatus of this general type upon reading the following specification and inspecting the accompanying drawings, in which:

FIG. 7 is a longitudinal cross sectional view of a conduction pumping mechanism corresponding in concept to FIG. 6;

FIG. 8 is a sectional view taken along the line VIII-VIII of FIG. 7;

FIG. 9 is a longitudinal sectional view corresponding to FIG. 6;

FIG. 10 is a sectional view taken along the line X-X of FIG. 9;

DETAILED DESCRIPTION

The concept of conduction pumping is set forth in detail in pending application Serial No. PCT/US01/22803, filed Jul. 18, 2001. Thus, further discussion concerning the concept is believed unnecessary, especially since the disclosure in that application is incorporated herein by reference.

Figures 1, 2:
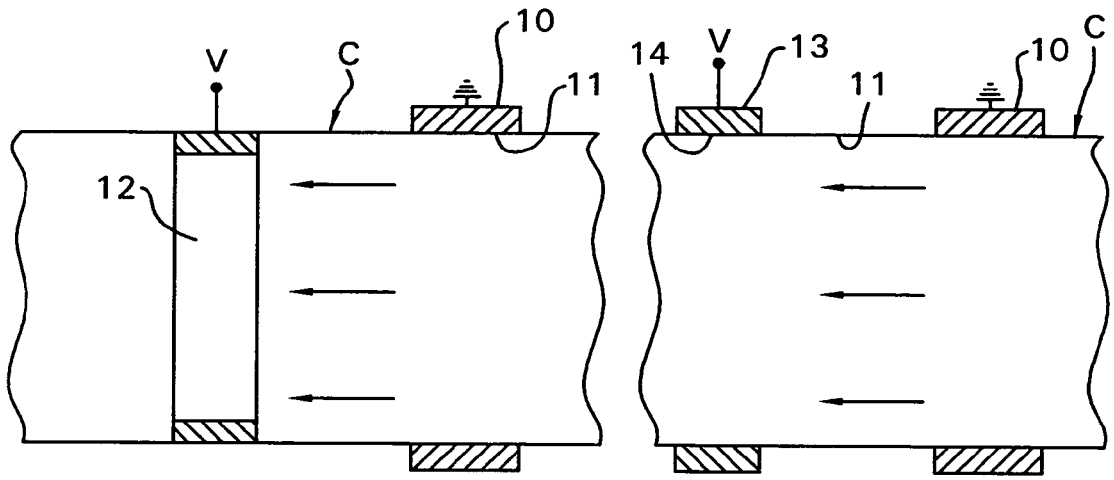
FIG. 1 is a schematic illustration of a first embodiment of a conduction pumping mechanism consisting of a high voltage ring electrode and a ring electrode ground oriented on a conduit configured to convey a liquid therein.
FIG. 2 is a schematic illustration of a second embodiment of a conduction pumping mechanism.

Referring to FIG. 1, there is provided an elongate conduit C configured for transporting a liquid therethrough. A ground electrode 10 is provided on the conduit with the radially inner surface of the electrode 10 being flush with the inside surface 11 of the conduit C. A ring high voltage electrode 12 is mounted to the inside surface 11 of the conduit C with the cross section of the ring extending from the inside wall of the conduit radially inwardly a finite distance. FIG. 2 illustrates a conduction pumping mechanism similar to FIG. 1 except that the high voltage electrode 13 is configured so that the inside surface 14 thereof is flush with the inside surface 11 of the conduit C. It is to be understood that the term "flush" as used herein and elsewhere is to embrace locations wherein the electrodes are spaced radially inwardly and outwardly from the surface 11 a small distance.

Figure 3:
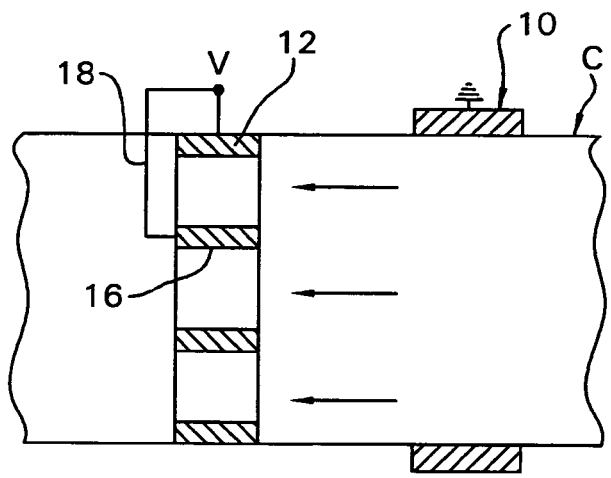
FIG. 3 is a schematic illustration of a third embodiment of a conduction pumping mechanism which includes two radially spaced rings configured for high voltage in conjunction with a grounded ring electrode.
Figure 4:
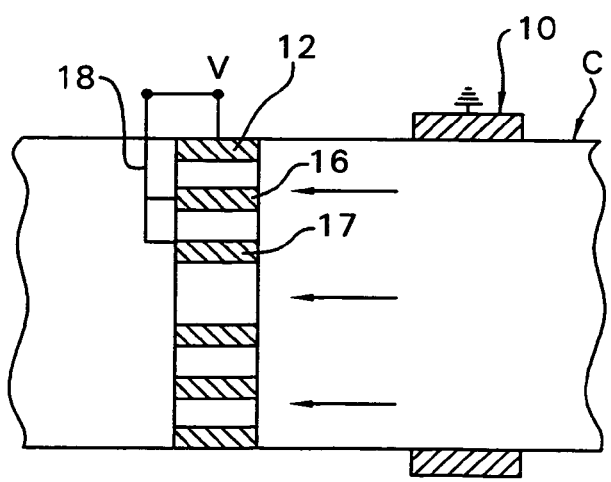
FIG. 4 is a schematic illustration of a fourth embodiment of a conduction pumping mechanism having three radially spaced ring electrodes configured for high voltage application in conjunction with a grounded ring electrode.

FIG. 3 illustrates a conduction pumping mechanism similar to FIG. 1 except that an additional ring 16 is concentrically oriented inside the ring 12 with both rings being connected to a high voltage source V. FIG. 4 is similar to FIG. 3 except that there is an additional ring 17 concentrically disposed relative to the two other rings 12 and 16. In the embodiment of FIGS. 3 and 4, the centrally disposed rings 16 and 17 are suspended by the electrical connection 18 that serves to connect each of the rings to the high voltage source V.

Figure 5:
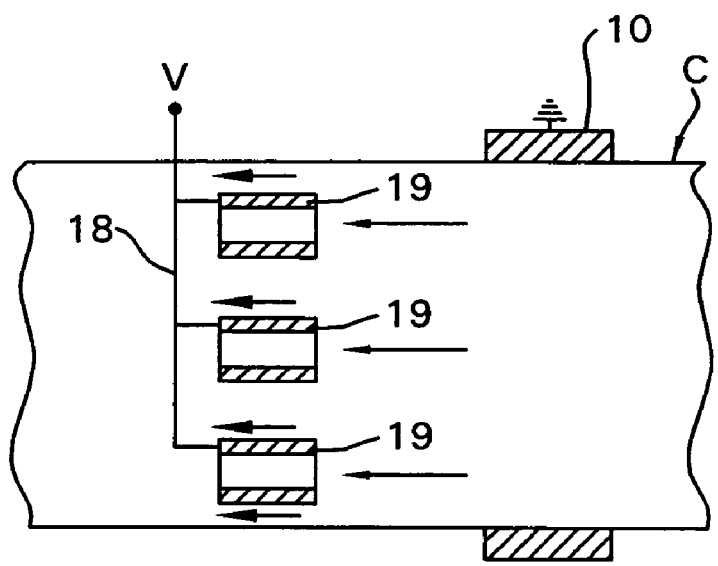
FIG. 5 is a schematic illustration of a fifth embodiment of a conduction pumping mechanism utilizing spaced tubes suspended in a conduit and configured for high voltage application in conjunction with a grounded ring electrode.

FIG. 5 is a schematic illustration of a conduction pumping mechanism inside a conduit C and with a ground ring electrode 10 identical to that in the preceding FIGS. 1-4. A plurality of hollow tubes 19 are suspended inside the conduit C by connection to the electrical conductor 18 that connects the aforesaid hollow tubes 19 to a high voltage source V. In this particular embodiment, the central axes of the hollow tubes 19 are parallel to each other and parallel to the longitudinal axis of the elongate conduit 19. In this particular embodiment, and as depicted by the arrows of the total net flow of liquid occurring across the cross section of the conduit, only some of the liquid will pass through the interior of the hollow tubes 19.

Figure 6:
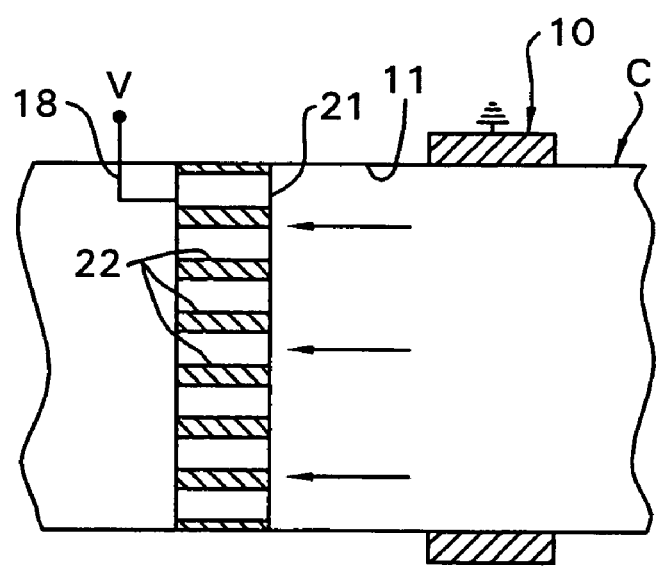
FIG. 6 is a schematic illustration of a sixth embodiment of a conduction pumping mechanism having a plate with multiple holes provided therethrough and configured for high voltage application in conjunction with a grounded ring electrode.

FIG. 6 schematically illustrates a conduction pumping mechanism utilizing a grounded electrode 10 identical to the grounded electrodes discussed above with respect to FIGS. 1-5. A flat plate or disc 21 having a plurality of holes 22 extending therethrough and on axes that are parallel to each other and to the longitudinal axis of the elongate conduit C is provided. The flat plate 21 is mounted to the inside surface 11 of the conduit C. The flat plate 21 is connected by an electrical connection 18 to a high voltage source V.

FIGS. 7 and 8 illustrate a configuration wherein the diameter of the holes 22 in the flat plate 21 have a diameter of 1.14 mm. FIGS. 7 and 8 furthermore illustrate the structure of the conduit for facilitating an orienting of multiple pairs of electrodes along the length of the conduit C. FIGS. 9 and 10, on the other hand, are similar to FIGS. 7 and 8 and illustrate that the diameter of the holes 22 in the flat plate 21 are 1.59 mm. FIGS. 7-10 also illustrate that the flat plate 21 can be oriented inside the conduit C by suspending it from the electrical conductor 18 facilitating connection thereof to the high voltage source V.

Figure 11:
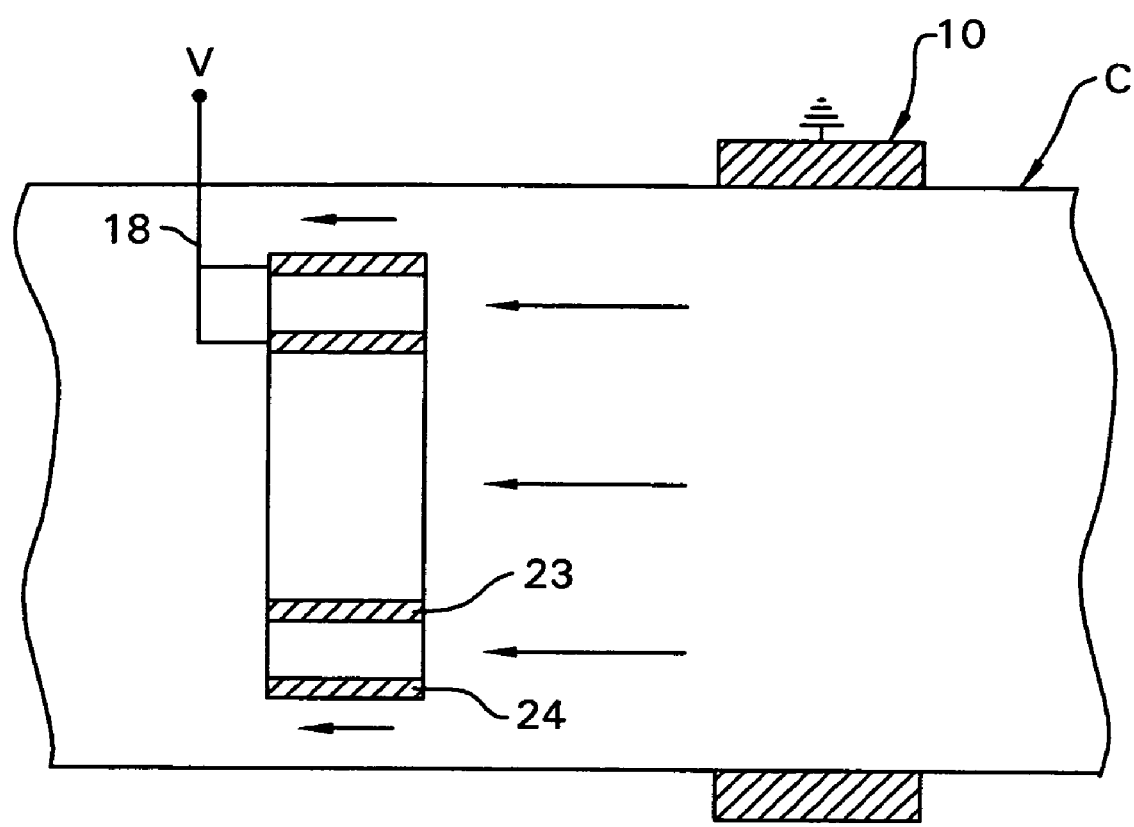
FIG. 11 is a schematic illustration of a seventh embodiment of a conduction pumping mechanism wherein concentric annular rings are configured for high voltage are suspended within the conduit and in conjunction with a grounded ring electrode.

FIG. 11 schematically illustrates a conduction pumping mechanism similar to FIG. 3 except that the two annular rings which are concentric with each other and with the longitudinal axis of the conduit C and are suspended in the interior of the conduit by the electrical connection 18 which facilitates connection of the rings 23 and 24 to the high voltage source V. While two rings 23 and 24 are illustrated, more rings can be provided where desirable. In this particular embodiment, and as depicted by the arrows, of the total net flow of liquid occurring across the cross section of the conduit, only some of the liquid will pass through the interior of the rings 23 and 24. The grounded ring electrode 10 is identical to the configurations shown in the preceding figures.

Figure 12:
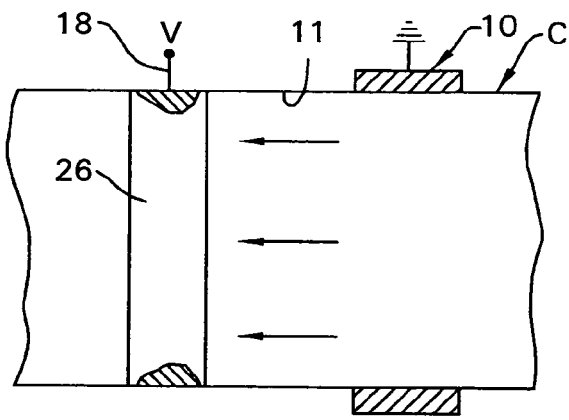
FIG. 12 is a schematic illustration of an eighth embodiment of a conduction pumping mechanism similar to FIG. 1 wherein the high voltage electrode is of a differing configuration.

FIG. 12 is similar to FIG. 1 except that the electrode 26, corresponding to the electrode 12 in FIG. 1, is of a rounded configuration to form a rounded protuberance extending radially inwardly from the interior wall 11 of the conduit C. The grounded ring electrode 10 is identical to the configuration illustrated in FIG. 1. The electrical connection 18 facilitates connection of the electrode 26 to a high voltage source V.

Figure 13:
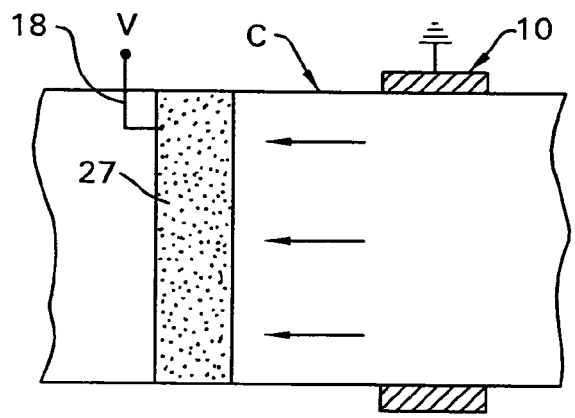
FIG. 13 is a schematic illustration of a ninth embodiment of a conduction pumping mechanism similar in concept to FIGS. 6-10 wherein the high voltage electrode is a porous plate or disc through which all of the liquid must pass.

FIG. 13 illustrates a flat plate or disc 27 which is porous and which is connected by the electrical connection 18 to the high voltage source V. The grounded ring electrode 10 is identical to the grounded ring electrodes discussed above.

Figure 14:
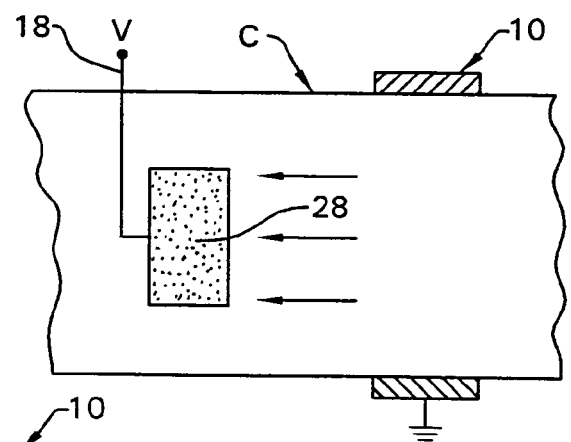
FIG. 14 is a schematic illustration of a tenth embodiment of a conduction pumping mechanism wherein the plate or disc is porous and is smaller in cross section than the cross section of the conduit.
Figure 15:
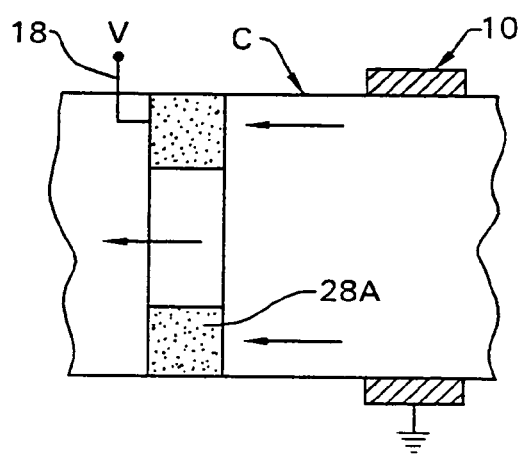
FIG. 15 is a schematic illustration of an eleventh embodiment of a conduction pumping mechanism similar to FIG. 13 wherein an annular ring is porous.

FIG. 14 schematically illustrates a conductive pumping mechanism wherein a flat plate or disc 28 is porous and is suspended in the conduit C by the electrical connection 18 in generally the central region of the cross section of the conduit. The grounded ring electrode 10 is identical to the electrodes shown and described above. The annular porous flat plate or disc 28A as shown in FIG. 15 is supported by the conduit C.

Figure 16:
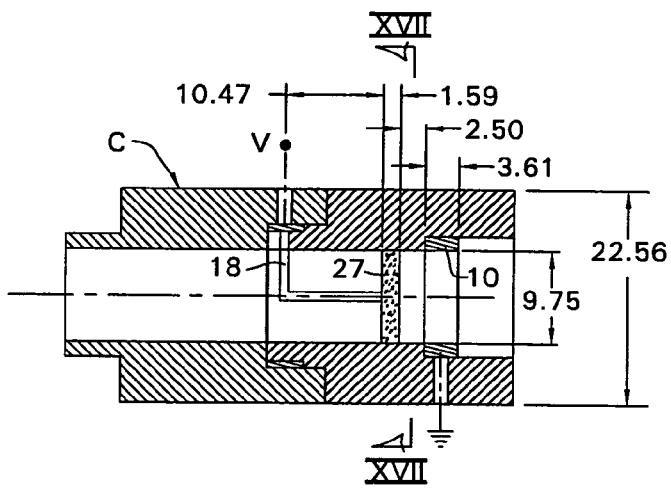
FIGS. 16-19 are respective cross sectional views illustrating differing porosities of the high voltage electrode corresponding to FIG. 13.
Figure 17:
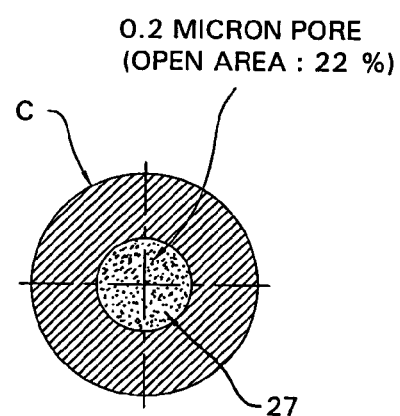
Figure 18:
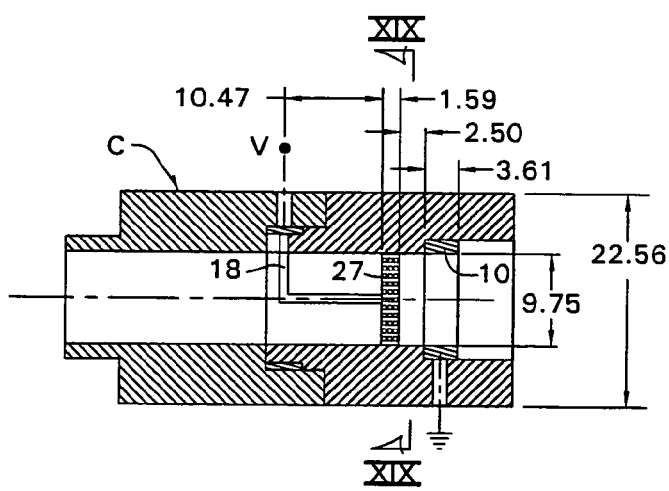
Figure 19:
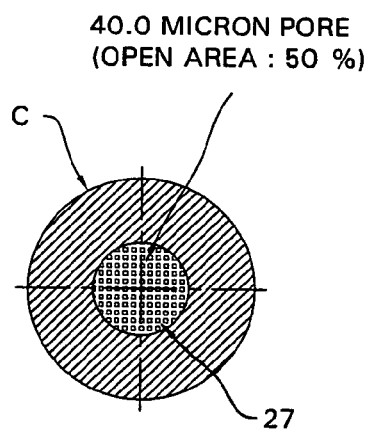

FIGS. 16-19 disclose embodiments corresponding to FIG. 13. FIGS. 16 and 17 illustrate a porous plate or disc wherein the porosity is 0.2 microns in FIGS. 16 and 17 and 40.0 microns in FIGS. 18 and 19. In addition, FIGS. 16-19 illustrate the format for the conduit and the electrodes 27 and 10 so that a multiple set of pairs can be oriented one after the other along the length of the conduit C to facilitate conduction pumping of the liquid being transported through the conduit C and through the porous electrode 27.

Figure 20:
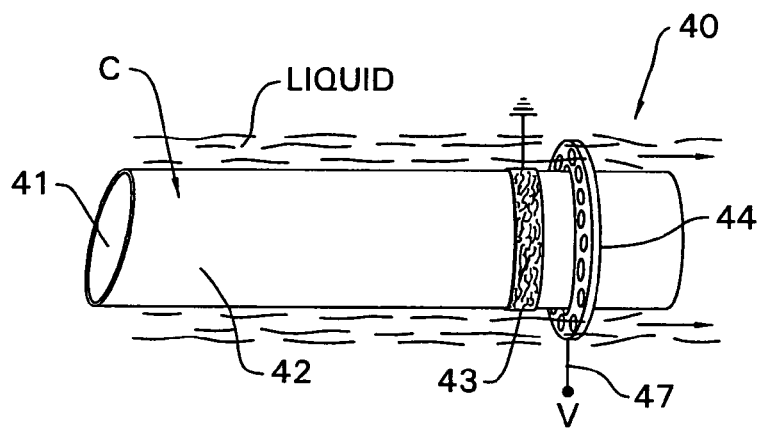
FIG. 20 is a schematic illustration of a conduction pumping thermal energy transfer system wherein liquid is present on the outer surface of a heat transfer element.
Figure 21:
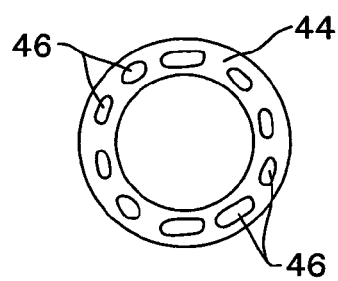
FIG. 21 is a plan view of a high voltage electrode utilized in FIG. 20.

FIG. 20 illustrates an electrohydrodynamic conduction pumping thermal energy transfer system which utilizes a conduit having inside surface 41 and exterior surface 42. A grounded ring electrode 43 is provided on the exterior surface of the conduit and is axially spaced from an annular high voltage ring electrode plate 44 having a finite radial width as illustrated in FIG. 21. The ring electrode 44 has a plurality of side-by-side holes 46 extending therethrough. In this particular embodiment, the holes are cylindrical in nature although they could be of other configurations as well. The high voltage electrode 44 is connected through an electrical connection 47 to a high voltage source V. The high voltage electrode 44 is oriented axially spaced from the grounded ring electrode 43 in a manner similar to the configurations discussed above. In this particular embodiment, a cooling medium is transported through the interior of the conduit C so that, in a two phase liquid environment, a liquid condensate will form on the exterior surface of the conduit C. The electrodes 43 and 44 are configured to be oriented in the liquid condensate and when electrical energy is applied to the electrodes, the liquid condensate and a limited amount of the adjacent vapor phase will be conductively pumped longitudinally of the conduit simultaneously while new condensation is forming on the exterior surface of the conduit C.

FIG. 20 could also be utilized in an environment where a heating medium is pumped through the interior of the conduit C to effect an evaporation of liquid interfacing with the exterior surface of the conduit C. In this instance, electrical energy applied to the electrodes 43 and 44 would effect movement of the liquid to facilitate a more efficient evaporative process.

Figure 22:
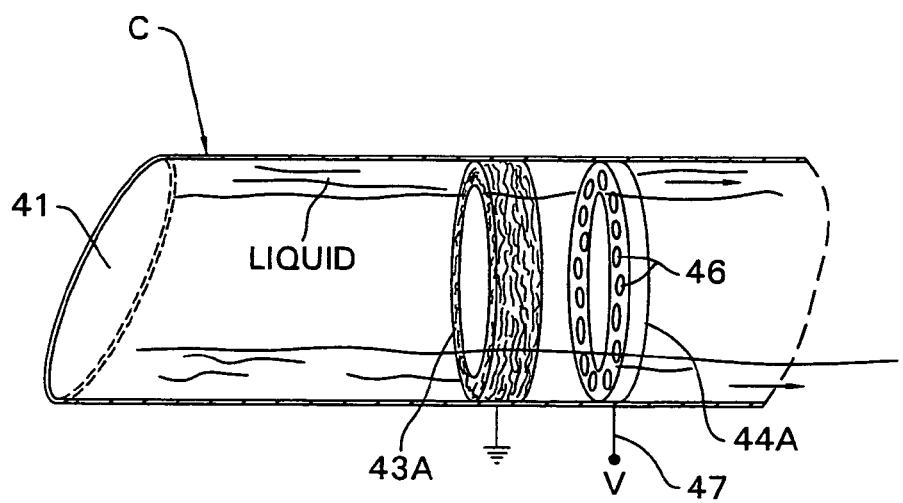
FIG. 22 is a schematic illustration of a conduction pumping thermal energy transfer system wherein liquid is present on the inside surface of the conduit and the electrode of FIG. 21 is oriented inside the conduit.

FIG. 22 is similar to FIG. 20 except that liquid is present on the inside surface 41 of the conduit 42. The ring electrode 43A and the ring electrode 44A are provided on the inside surface of the conduit C and are configured to be oriented within the liquid layer. The plural holes through the electrode 46 are also within the liquid, as is the case in the preceding embodiment so that liquid will pass through the holes 46 as a result of the conduction pumping phenomena. FIG. 22 is configured to be utilized in an environment where the liquid is a condensate or is a liquid to be evaporated in a manner similar to that described above for FIG. 20.

It is to be understood that in regions of the conduit whereat heat transfer is not taking place, arranging series arrays of electrode pairs in any liquid present thereat will, when appropriately energized, facilitate the movement thereof to a desired destination.

Figure 23:
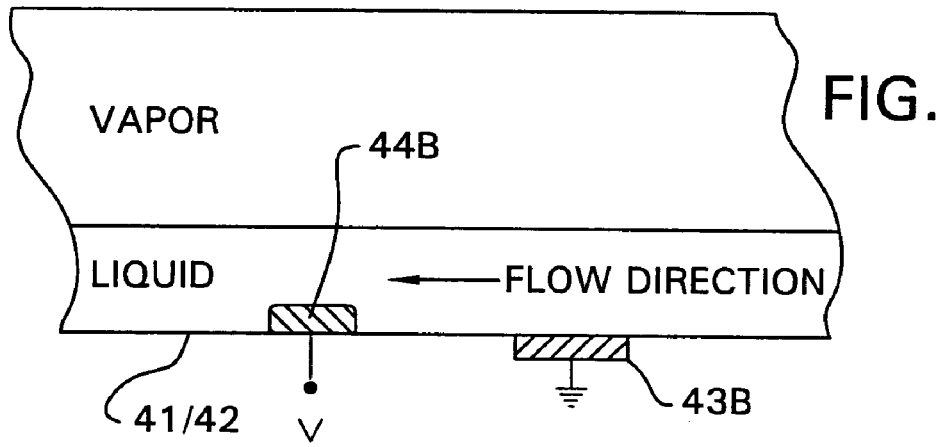
FIGS. 23 to 25 are enlarged schematic illustrations of alternate electrode configurations for the embodiments of FIGS. 20 and 22.
Figure 24:
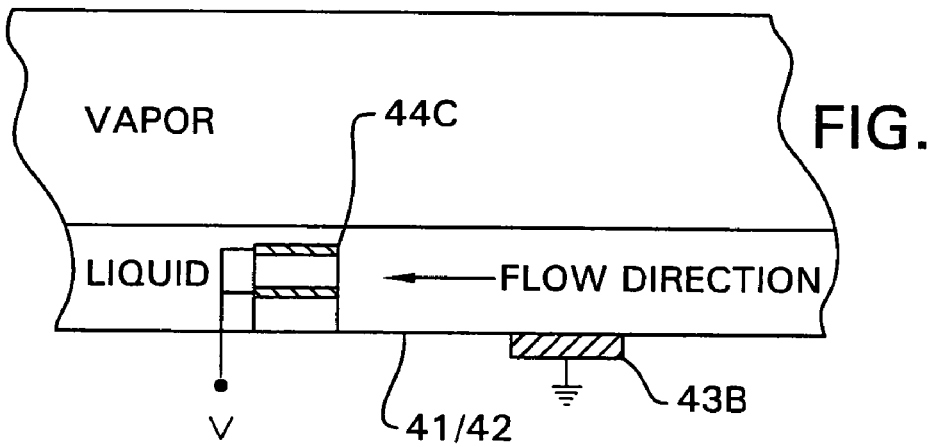
Figure 25:
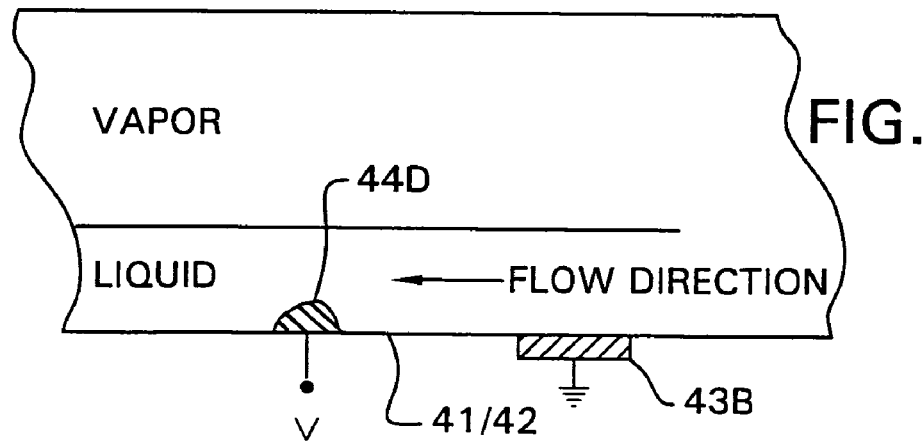

FIGS. 23 to 25 illustrate different electrode designs for the embodiments of FIGS. 20 and 22. FIG. 23 schematically illustrates an electrode design 43B, 44B similar to FIG. 1. FIG. 24 schematically illustrates a grounded electrode 43B similar to FIG. 23 while the high voltage electrode 44C is in the form of rings concentric with the axis of the conduit C. FIG. 25 schematically illustrates an electrode design 44D, 44B similar to FIG. 12.

While in the preceding discussion the conduits and electrodes have been depicted as circular in cross section, it is to be understood that all non-circular cross sections are embraced within the scope of this disclosure. That is, the conduits and electrodes can have an elliptical cross section and the like or a polygonal cross section.

Figure 26:
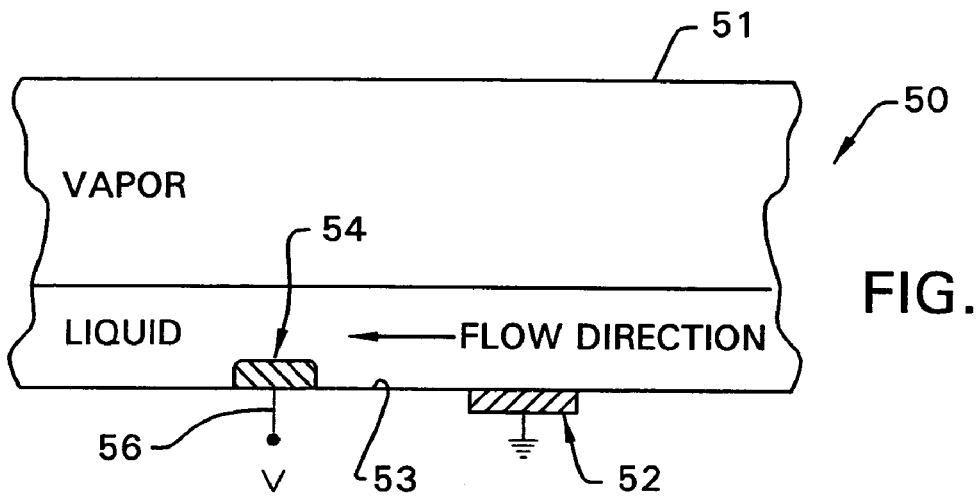
FIG. 26 is a schematic illustration of a conduction pumping thermal energy transfer system in a channel environment.

FIG. 26 schematically illustrates a conduction pumping mechanism 50 used in association with a liquid guiding channel 51. In this embodiment, the grounded electrode 52 is a plate oriented flush with the bottom surface 53 of the channel 51. The high voltage electrode 54 is connected by an electrical connection 56 to a high voltage source V. In this particular embodiment, the high voltage electrode protrudes into the interior of the channel and both electrodes 52 and 54 are configured to be oriented within the liquid.

Figure 27:
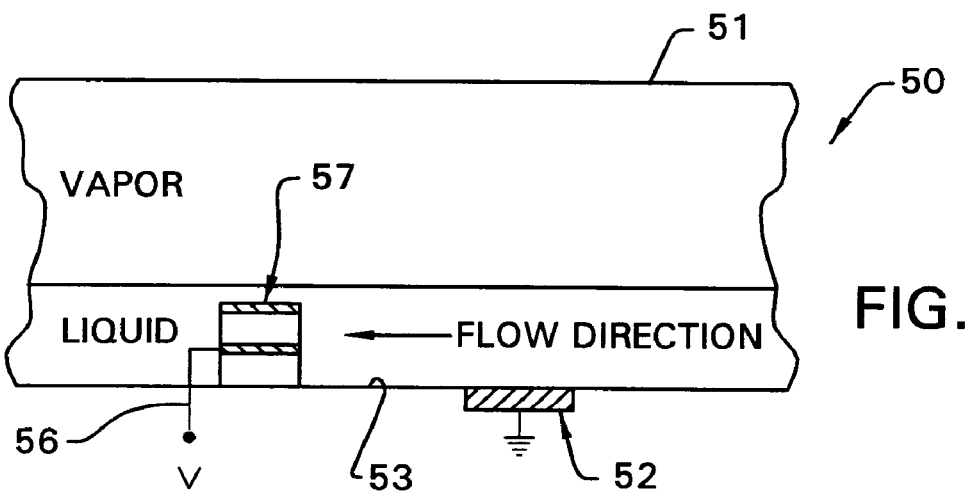
FIG. 27 is a schematic illustration similar to FIG. 23 except that the high voltage electrode is in the form of parallel plates.

FIG. 27 is similar to FIG. 26 except that the high voltage electrode is a pair of parallel plates 57 extending parallel to the longitudinal axis of the channel 51 and to the bottom surface 53 of the channel 51.

Figure 28:
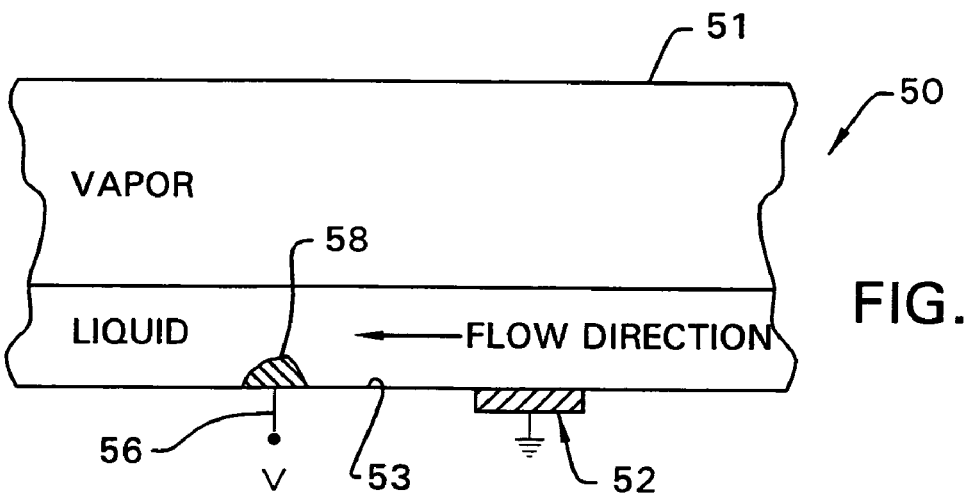
FIG. 28 is a schematic illustration similar to FIG. 23 except that the high voltage electrode is of a differing configuration.

FIG. 28 is similar to FIG. 26 except that the high voltage electrode 58 has a rounded surface configuration as compared to the more rectangular version illustrated in FIG. 26.

Figure 29:
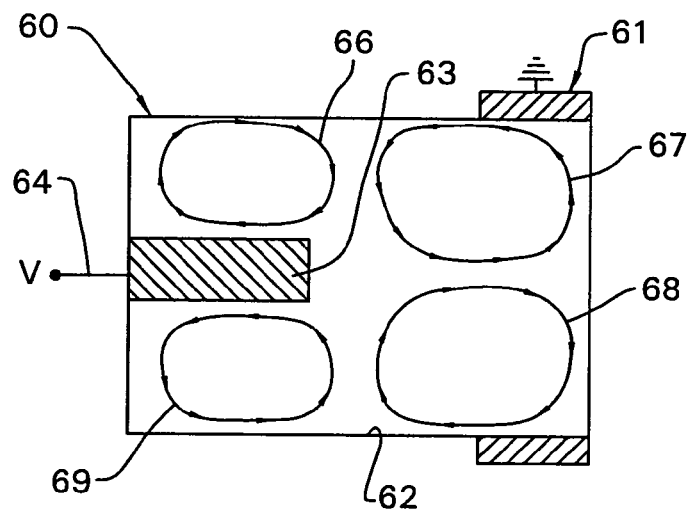
FIG. 29 is a schematic illustration of a vessel housing liquid therein and in which is provided a conduction pumping mechanism.

FIG. 29 schematically illustrates a vessel 60 housing a liquid therein with a grounded ring electrode 61 oriented so that the interior surface thereof is flush with the interior surface 62 of the vessel 60. An elongate bar 63 is oriented inside the vessel 60 and is configured to serve as the high voltage electrode connected through an electrical connection 64 to the high voltage source V. In this particular embodiment, and since the vessel is closed, electrical energy applied to the electrodes 61 and 63 will effect a circulatory motion of the liquid in directions indicated by the arrows 66-69. This configuration will facilitate in circulatory motion of liquids in environments where circulation is required.

Figure 30:
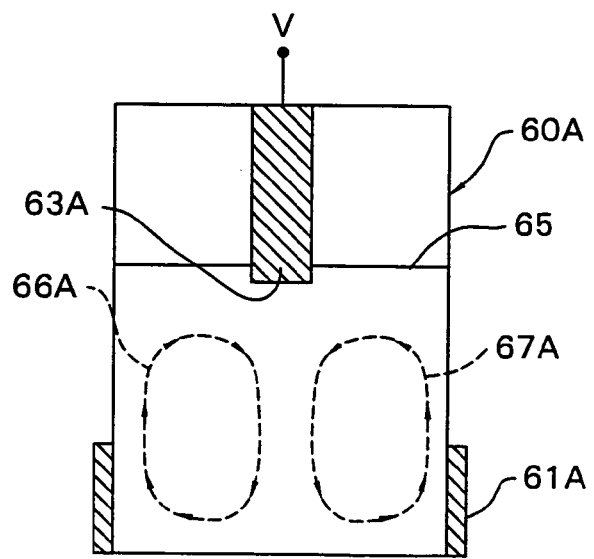
FIG. 30 is a schematic illustration of a vessel partially filled with liquid and in which is provided a conduction pumping mechanism.

FIG. 30 schematically illustrates a vessel 60A partially filled with liquid 65. Electrical energy applied to the electrodes 61A and 63A will effect a circulatory motion of the liquid in directions indicated by the arrows 66-67.

Figure 31:
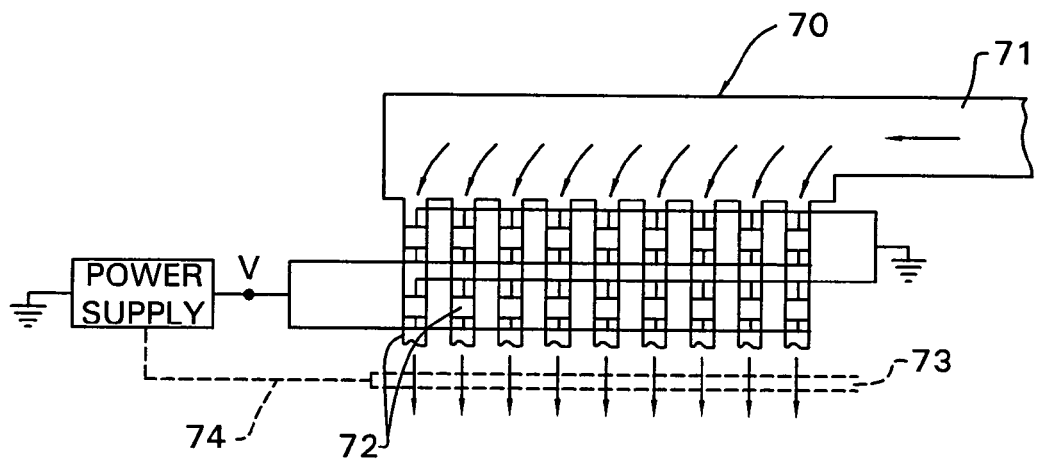
FIG. 31 is a schematic illustration of a manifold having a single liquid input and plural liquid outputs with one or more conduction pumping mechanisms oriented in each of the outlets in order to balance the liquid flow through each of the outlets.

FIG. 31 schematically illustrates a manifold 70 having a liquid inlet port 71 and plural liquid outlet ports 72. The liquid outlet ports 72 are in the form of conduits similar to the conduits described above and each conduit has a series of electrodes therein. The volume of liquid passing through each conduit 72 is monitored by a detector 73 and the voltage of the power supply is determined by a signal transmitted from the liquid flow detector 73 through the control lines 74 to the power supply to regulate the amount of high voltage V applied to the high voltage electrodes. The conduction pumping mechanisms in each conduit will therefore serve to effect an equalized flow of single phase liquid or two phase liquid/vapor through each of the conduits. It is additionally possible for the liquid flow detection device 73 to separately monitor the liquid flow through each conduit so that a corresponding electrical signal will be sent through a corresponding control line 74 to multiple and separate power supplies so that the volume of liquid being conduction pumped through each conduit will be precisely regulated.

Embraced within this disclosure is the feature of vapor depositing the electrodes onto the surface of the conduit or channel. Also embraced within this disclosure is the use of the conduction pumping mechanism to facilitate pumping of liquid and any bubbles therein.

While the electrodes have been illustrated in the drawings as having sharp corners, edges and the like, it is to be understood that the corners and edges of all electrodes are radiused. The magnitude of the radius is a function of the magnitude of the voltage and the magnitude of the electric fields. The rounded corners and edges will prevent ion injection during conduction pumping.

A grounded electrode has been specifically referenced in each of the above embodiments. It is to be understood that the phrases "high voltage electrode" and "high voltage source" as used herein and throughout merely indicate that there is to exist a sufficient potential difference between the electrodes to generate electric fields therebetween.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An electrohydrodynamic conduction liquid pumping system, comprising:
    an elongate conduit configured to transport a liquid;
    at least a single pair of electrodes disposed in a spaced apart relation to each other inside the conduit and configured to be oriented in the liquid;
    a power supply coupled to the electrodes and operable to generate electric fields in between said pair of electrodes, the electric forces inducing a net axial movement of the liquid along the conduit; and
    a first electrode of said pair of electrodes comprising a first electrically conductive element oriented so that it is flush with an inside surface of said conduit and is electrically coupled to a first potential source of said power supply, a second electrode of said pair of electrodes comprising a second electrically conductive element electrically coupled to a second potential source on said power supply and being configured as a plurality of hollow tubes suspended in a plane oriented transverse to a longitudinal axis of the conduit and through which at least some of the liquid must pass during its net axial movement along the conduit.

2. The pumping system according to claim 1, wherein said hollow tubes each have an axis extending parallel to the longitudinal axis of said conduit.

3. The pumping system according to claim 2, wherein said hollow tubes are in the form of an integral porous plate contained in a plane oriented transverse to a longitudinal axis of the conduit and through which all of the liquid must pass during its net axial movement along the conduit.

4. The pumping system according to claim 3, wherein said porous plate is a plate having a plurality of axially extending side-by-side cylindrical holes therethrough.

5. The pumping system according to claim 4, wherein a diameter of each of said holes is the same.

6. The pumping system according to claim 4, wherein a diameter of each of said holes is the same and is in the range of 1.10 mm to 1.70 mm.

7. The pumping system according to claim 6, wherein the diameter is 1.14 mm.

8. The pumping system according to claim 6, wherein the diameter is 1.59 mm.

9. The pumping system according to claim 1, wherein said plurality of hollow tubes are concentrically oriented and have an axis extending parallel to the longitudinal axis of said conduit.

10. The pumping system according to claim 9, wherein two hollow tubes are concentrically oriented.

11. The pumping system according to claim 9, wherein three hollow tubes are concentrically oriented.

12. The pumping system according to claim 9, wherein an outermost one of said hollow tubes is mounted to an inside surface of said conduit.

13. The pumping system according to claim 12, wherein two hollow tubes are concentrically oriented.

14. The pumping system according to claim 13, wherein three hollow tubes are concentrically oriented.

15. The pumping system according to claim 1, wherein said first potential source is a ground potential.

16. An electrohydrodynamic conduction liquid pumping system, comprising:
an elongate conduit configured to transport a liquid;
at least a single pair of electrodes disposed in a spaced apart relation to each other inside the conduit and configured to be oriented in the liquid; and
a power supply coupled to the electrodes and operable to generate electric fields in between said pair of electrodes, the electric forces inducing a net axial movement of the liquid along the conduit; and
a first electrode of said pair of electrodes comprising a first electrically conductive element oriented so that it is flush with an inside surface of said conduit and is electrically coupled to a first potential source of said power supply, a second electrode of said pair of electrodes comprising a second electrically conductive element electrically coupled to a second potential source of said power supply and being configured as a flat plate, at least a portion of said flat plate being porous.

17. The pumping system according to claim 16, wherein said porous portion has a porosity in the range of 0.2 microns to 50 microns.

18. The pumping system according to claim 17, wherein the porosity of said plate is 0.2 microns.

19. The pumping system according to claim 17, wherein the porosity of said plate is 40 microns.

20. The pumping system according to claim 16, wherein all of said flat plate is porous.

21. The pumping system according to claim 16, wherein an annulus segment of said flat plate is porous.

22. The pumping system according to claim 16, wherein a central section of said flat plate is porous.

23. An electrohydrodynamic conduction liquid pumping system, comprising:
an elongate conduit configured to transport a liquid;
at least a single pair of electrodes disposed in a spaced apart relation to each other inside the conduit and configured to be oriented in the liquid;
a power supply coupled to the electrodes and operable to generate electric fields in between said pair of electrodes, the electric forces inducing a net axial movement of the liquid along the conduit; and
a first electrode of said pair of electrodes comprising a first electrically conductive element oriented so that it is flush with an inside surface of said conduit and is electrically coupled to a first potential source of said power supply, a second electrode of said pair of electrodes comprising a second electrically conductive element electrically coupled to a second potential source on said power supply and being configured as a profile mounted to an inside surface of said conduit.

24. The pumping system according to claim 23, wherein said conduit is a channel and wherein said channel is configured to facilitate flow of the liquid therein.

25. The pumping system according to claim 24, wherein said profile is mounted flush with only a fragment of an inside surface of said conduit.

26. The pumping system according to claim 24, wherein said profile is a raised profile protruding from said fragment of said inside surface of said conduit.

27. The pumping system according to claim 26, wherein said raised profile is a profile with a curved shaped surface exposed to the liquid.

28. The pumping system according to claim 26, wherein said raised profile is a profile with a polygonally-shaped surface exposed to the liquid.

29. The pumping system according to claim 24, wherein said profile is a hollow tube suspended in the liquid.

30. The pumping system according to claim 23, wherein said first electrically conductive element is a first ring and wherein said profile is a second ring mounted to an inside surface of the conduit, said second ring and said first ring being oriented in parallel planes oriented transverse to a longitudinal axis of said conduit.

31. The pumping system according to claim 30, wherein said second ring is flush with an inside surface of said conduit.

32. The pumping system according to claim 30, wherein said second ring has a raised profile forming a protuberance on an inside surface of said conduit.

33. The pumping system according to claim 30, wherein said raised profile is a curved profile.

34. The pumping system according to claim 30, wherein said raised profile is a polygonal profile.

35. The pumping system according to claim 23, wherein said first potential source is a ground potential.

36. An electrohydrodynamic conductor liquid pumping thermal energy transfer system, comprising:
   an elongate conduit configured to transport a heating or a cooling liquid medium and having an exterior surface;
   at least a single pair of electrodes disposed in a spaced apart relation to each other on the exterior surface of the conduit and configured to be oriented in a liquid phase on the exterior surface;
   a power supply coupled to the electrodes and operable to generate electric fields in the liquid phase in between said pairs of electrodes, the electric forces inducing a net axial movement of the liquid phase along the exterior surface; and
   a first electrode of said pair of electrodes comprising a first electrically conductive element oriented so that it is flush with the exterior surface and is electrically coupled to a first potential source of said power supply, a second electrode of said pair of electrodes comprising a second electrically conductive element electrically coupled to a second potential source of said power supply and being configured as a ring having an axially directed porosity through which the liquid phase must pass during its net axial movement along the exterior surface.

37. The pumping thermal energy transfer system according to claim 36, wherein said porosity is in the form of plural side-by-side holes extending through a body of the ring, said liquid phase passing through the holes.

38. The pumping thermal energy transfer system according to claim 36, wherein said first potential source is a ground potential.

39. An electrohydrodynamic conduction liquid pumping thermal energy transfer system, comprising:
   an elongate conduit having an exterior surface configured to interface with a heating or a cooling medium, said interior surface having a liquid phase layer thereon;
   at least a single pair of electrodes disposed in a spaced apart relation to each other inside the conduit and configured to be oriented in the liquid phase layer;
   a power supply coupled to the electrodes and operate to generate electric fields in between said pair of electrodes, the electric forces inducing a net axial movement of the liquid phase along the interior surface; and
   a first electrode of said pair of electrodes comprising a first electrically conductive ring oriented in that it is flush with the interior surface and is electrically coupled to a first potential source of said power supply, a second electrode of said pair of electrodes comprising a second electrically conductive ring coupled to a second potential source of said power supply and having an axially directed porosity through which the liquid phase must pass during its net axial movement along the interior surface.

40. The pumping thermal energy transfer system according to claim 39, wherein said porosity is in the form of plural side-by-side holes extending through a body of the ring, said liquid phase passing through the holes.

41. The pumping thermal energy transfer system according to claim 39, wherein said first potential source is a ground potential.

* * * * *